United States Patent
Önnestam

(10) Patent No.: US 12,044,280 B2
(45) Date of Patent: Jul. 23, 2024

(54) DISK BRAKE AND BRAKE ACTUATION MECHANISM

(71) Applicant: Haldex Brake Products AB, Landskrona (SE)

(72) Inventor: Kjell Önnestam, Löddeköpinge (SE)

(73) Assignee: Haldex Brake Products AB, Landskrona (SE)

( * ) Notice: Subject to any disclaimer, the term of this patent is extended or adjusted under 35 U.S.C. 154(b) by 1127 days.

(21) Appl. No.: 16/617,189

(22) PCT Filed: May 24, 2018

(86) PCT No.: PCT/EP2018/063740
§ 371 (c)(1),
(2) Date: Dec. 21, 2020

(87) PCT Pub. No.: WO2018/215633
PCT Pub. Date: Nov. 29, 2018

(65) Prior Publication Data
US 2021/0108690 A1    Apr. 15, 2021

(30) Foreign Application Priority Data
May 26, 2017   (DE) ............... 10 2017 005 027.9

(51) Int. Cl.
| F16D 55/02 | (2006.01) |
| F16D 55/2255 | (2006.01) |
| F16D 65/18 | (2006.01) |
| F16D 65/56 | (2006.01) |
| B60T 1/06 | (2006.01) |

(52) U.S. Cl.
CPC ....... *F16D 65/567* (2013.01); *F16D 55/2255* (2013.01); *F16D 65/18* (2013.01); *B60T 1/065* (2013.01)

(58) Field of Classification Search
CPC .... F16D 65/567; F16D 55/2255; F16D 65/18; B60T 1/065
See application file for complete search history.

(56) References Cited

U.S. PATENT DOCUMENTS

| 5,788,022 A | * | 8/1998 | Antony | ................... F16D 65/18 |
| | | | | 188/196 D |
| 2013/0008749 A1 | * | 1/2013 | Sandberg | ................ F16D 65/18 |
| | | | | 29/446 |

(Continued)

FOREIGN PATENT DOCUMENTS

| WO | 2011113554 A2 | 9/2011 |
| WO | 2013083857 A2 | 6/2013 |

(Continued)

OTHER PUBLICATIONS

International Search Report and Written Opinion of the International Searching Authority Application No. PCT/EP2018/063740 Completed: Sep. 14, 2018 Mailing Date: Sep. 25, 2018 pp. 7.

*Primary Examiner* — Nicholas J Lane
(74) *Attorney, Agent, or Firm* — Price Heneveld LLP

(57) ABSTRACT

The invention relates to a brake actuation mechanism for a disc brake, comprising an adjusting device that can be rotated on a rod and is axially displaceably guided at least in parts. The invention also relates to a disc brake comprising said type of brake actuation mechanism.

13 Claims, 9 Drawing Sheets

(56) References Cited

U.S. PATENT DOCUMENTS

2014/0048358 A1* 2/2014 Jungmann ............. F16D 65/567
                                                        188/71.9
2017/0175837 A1* 6/2017 Pehle .................... F16D 65/567
2019/0368561 A1* 12/2019 Sandberg ................ F16D 65/18

FOREIGN PATENT DOCUMENTS

| WO | 2014106672 A1 | 7/2014 |
| WO | 2015140225 A2 | 9/2015 |

* cited by examiner

M—M

L—L

S-S

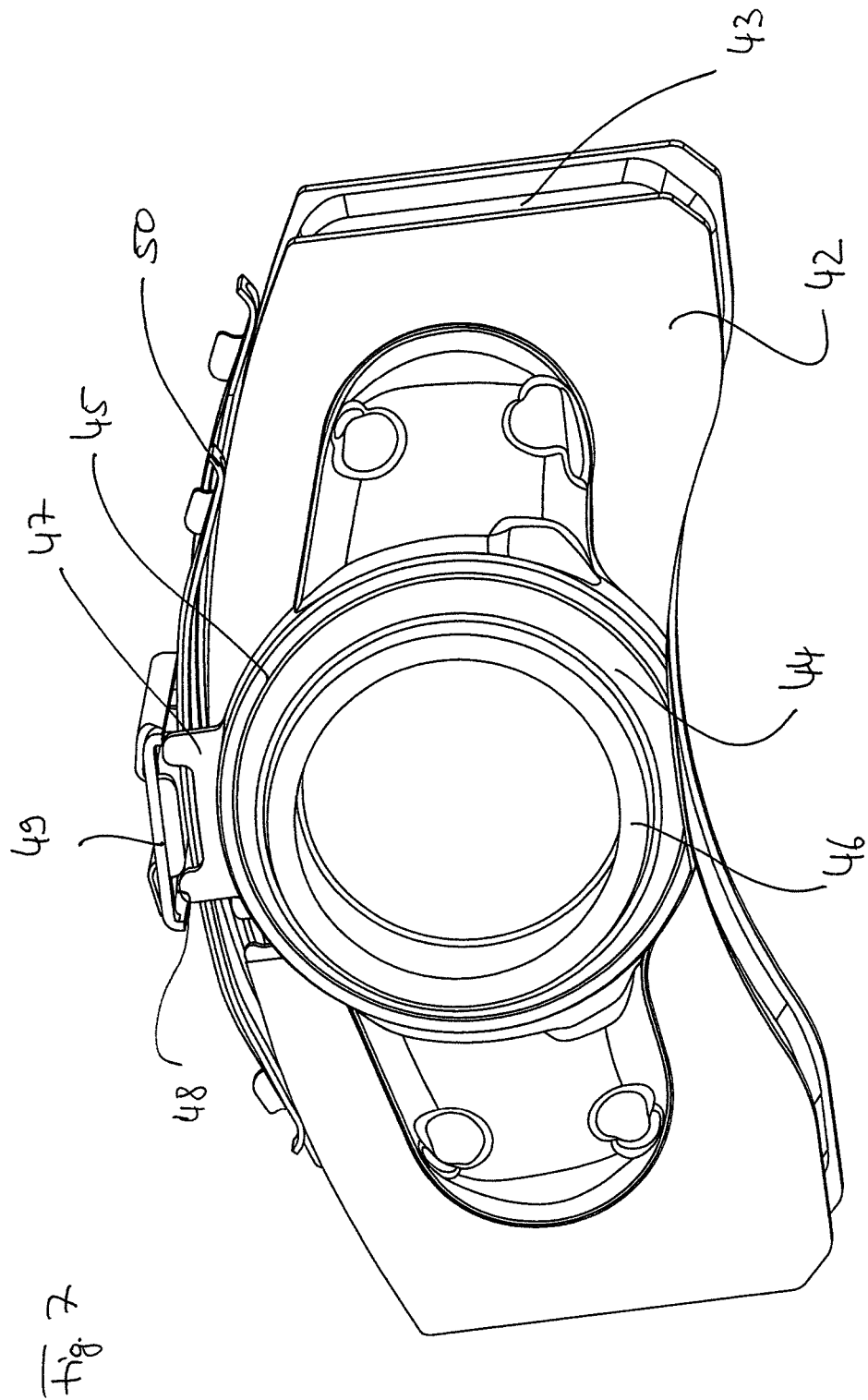

DISK BRAKE AND BRAKE ACTUATION MECHANISM

FIELD OF THE INVENTION

The present invention concerns a brake actuation mechanism for a disc brake and a disc brake, in particular for commercial vehicles, comprising such a brake actuation mechanism.

The invention covers disc brakes which have either a sliding caliper or a fixed caliper and which overlap one or more brake discs. The invention relates mainly, but not exclusively, to spot-type disc brakes.

BACKGROUND OF THE INVENTION

Disc brakes, in particular for heavy goods vehicles, are known in many different forms, both in terms of the type of brake actuation mechanism, the way in which the braking force is transmitted to one or more brake discs and the type of adjustment to compensate for brake pad wear.

A special version of a brake actuation device used in disc brakes is known, for example, from the applicant's International Application WO 2011/113554 A2. The brake actuation mechanism known from that application is characterized by an extremely compact design which requires less space in the housing of the brake caliper and is lighter. All the components of that brake actuation mechanism are mounted in the brake caliper by means of a rod mounted in the housing of the brake caliper in an axial direction so as to interact functionally in such a way that they act parallel to the axis of rotation of the brake disc. As a result of a displacement movement of the amplification mechanism, a thrust element together with an adjusting device executes a translatory movement in the direction of the brake disc in order to transmit the clamping force.

The adjusting device for compensating wear has a torque clutch which is torque-controlled and serves to selectively transmit rotation between components of the torque clutch depending on the direction of rotation. In addition, the adjusting device also has a one-way clutch, in which two elements rotatably mounted on the rod, an inner receiving sleeve and a hollow shaft are connected to each other by means of a freewheel spring, the one-way clutch being designed in such a way that it transmits a rotational movement between the two elements during brake actuation, while it slips when the brake is released.

With regard to the exact functioning of the brake actuation mechanism known from the state of the art in terms of feed and transmission of the braking force and the adjusting movement, explicit reference is hereby made to the disclosure content of WO 2011/113554 A2. Other similarly designed brake actuation mechanisms are known, for example, from WO 2013/083857 A2, WO 2014/106672 A2 or WO 2015/140225 A2 of the applicant, to which explicit reference is also made herewith.

Common to the above-mentioned state of the art brake actuation mechanisms is that a hollow shaft, rotatably mounted on the rod, serves as the input element for the adjuster and is directly rotated by the lever of the amplification mechanism. For this purpose, a pin or similar element is provided on the hollow shaft at a suitable point, the pin projecting radially from the hollow shaft and being received with a defined clearance by a recess in the lever, in the area of its pivot bearing surface. This allows the hollow shaft to be set in rotation by a pivoting movement of the lever, which is then introduced into the adjusting device. As the swivelling movement of the lever progresses, the pressure on the pin of the hollow shaft, which is exclusively rotatably mounted, increases, whereby on the one hand the pressure from the lever acts mainly in the axial direction on the brake disc, thereby increasing the lever action on the pin, and whereby on the other hand, due to the relative movement between the recess of the brake lever and the pin during swivelling, an increased surface pressure acts, which leads to increased frictional forces between the surface of the pin and the surface of the recess in the common contact point.

With frequent brake actuations, as can occur for example in buses in public transport, the connection of pin and recess is therefore exposed to increased wear under certain circumstances, which is of course undesirable for reasons of functional safety and service life.

SUMMARY OF THE INVENTION

In view of this, the invention has the objective of providing a brake actuation mechanism which, in this respect, offers greater functional safety and at the same time a compact or more compact design. A further objective is to provide a brake actuating mechanism for a disc brake, in particular for commercial vehicles, in which the adjuster is subject to less wear with regard to its actuation. In addition, one objective is to provide a disc brake where such brake actuation mechanisms are used.

These objectives are solved with a brake actuation mechanism according to claim 1 and with a disc brake according to claim 12 comprising such a brake actuation mechanism.

In general, in principle independent of the concrete design of the brake actuation mechanism and the adjusting device implemented therein as well as the torque clutch used in connection with this adjusting device, the essence of the present invention lies in providing a brake actuation mechanism for a disc brake which comprises:

- an amplification mechanism for introducing a clamping force for braking,
- a thrust element for transmitting the clamping force to a brake disc, wherein the amplification mechanism and the thrust element cooperate so that the thrust element performs a movement towards the brake disc by a displacement movement of the amplification mechanism,
- and an adjusting device for compensating for lining wear, which cooperates with the thrust element, wherein the amplification mechanism, the thrust element and the adjusting device can be mounted in the brake caliper in a functionally cooperating manner by means of a rod which is mounted in a housing of a brake caliper of the disc brake so as to be immovable in the axial direction and non-rotatable, and wherein an input element of the adjusting device is mounted on the rod in a rotatable and axially displaceable manner.

Due to the fact that at least the input element on the rod, in addition to the rotational movement induced by the displacement movement of the amplification mechanism, usually by a pivoting movement of a lever of the amplification mechanism, can also move axially displaceably in the axial direction of the rod towards and away from the brake disc, when the clamping force is applied, the surface pressure and the frictional force at the connection point between the amplification mechanism and the input element for the adjuster, which is in the form of a hollow shaft, is reduced, i.e. usually between a radial pin or journal of the hollow shaft and the recess in the lever, since the extent of the relative movement between these elements is reduced overall.

Whereas in the state of the art as described, the pin performs exclusively a rotational movement around the axis of the rod when the recess in the lever performs a forward, i.e. towards the brake disc, rotary or circular movement corresponding to the pivoting movement of the lever, a combined rotary and axial displacement movement is performed by the input element and the pin which is usually integrally arranged on it. In other words, the pin moves together with the recess in the axial direction, while the pin can move relatively in the recess. As a result, the pin moves on a spiral or performs a partial screw movement.

In this context, the recess can also have a different inner contour compared to the state of the art, which is matched to the outer contour of the pin, taking into account the relative movement between the two elements, in order to keep the frictional forces as low as possible.

In one embodiment, the input element is under a defined preload or pretension, so that the displacement movement of the lever acts against this preload.

For this purpose, a spring element, e.g. an appropriately dimensioned helical spring coaxially surrounding the rod, may be provided which acts directly or indirectly between an abutment and the input element or the entire adjustment device.

In a preferred embodiment, the spring element is accommodated in a bearing body, e.g. received in a bearing sleeve, which maintains a defined distance from the abutment. This distance in the axial direction determines, from a design point of view, the maximum displacement on the rod that the input element and, as a rule, the entire adjusting device can cover.

The bearing sleeve is supported indirectly or directly on the input element in a force-transmitting manner.

This maximum travel thus also corresponds to the maximum travel which the contact point between the pin and the recess can travel on a spiral-like path.

The abutment is preferably located at the end of the rod facing the brake disc, at a point which, after the brake actuation mechanism has been assembled, determines the value of the preload of the spring element in accordance with the axial lengths of the other components of the amplification mechanism, the adjusting device, the resetting or return device and the thrust element. In other words, the dimensions or axial lengths of the individual components and of the rod are selected and matched to each other in such a way that, on the one hand, the spring element provides the desired preload and, on the other hand, the resetting device can also apply the desired resetting or return force.

In a further embodiment of the brake actuation mechanism according to the invention, the abutment, on which the spring element for the pretension is supported facing the brake disc, is rotatably mounted on the rod.

The abutment can thereby interact with other elements in a force and/or torque transmitting manner, such as an abutment shell against which a spring of the resetting device is supported. The abutment shell, in turn, is connected to an element of the adjusting device, such as a hollow spindle, in a torque-transmitting connection which, however, permits an axial displacement movement.

The abutment shell and thus the abutment for the spring element are held in a defined axial position on the rod by means of a fastening means.

According to the invention, it is intended that the frictional forces acting between the rod and the fastening element generate a defined torque or moment via their dimensioning and the surface design of the contact surfaces, which torque is introduced into the adjusting device and which is selected such that the wear between moving parts of the adjusting device can be reduced.

The input element, which is designed as a sleeve or hollow shaft, is coupled to a radial bearing hub via a first freewheel spring to form a first torque clutch. The radial bearing hub acting as an output element is axially connected to the actuating element acting as an input element, both components enclosing the first freewheel spring radially on the inside and the first freewheel spring maintaining a radial distance to the rod.

The radial bearing hub is connected via a radial ball bearing to a torque sleeve or a front clutch ring, viewed in relation to the brake disc, in a rotationally fixed but axially displaceable connection. The front clutch ring is coupled via a roller-ramp mechanism with a rear torque sleeve or a rear clutch ring to form a second torque clutch.

The rear clutch ring, in turn, is in a rotationally fixed connection with an adjusting spindle of the adjusting device radially surrounding it, which is in threaded engagement with a sleeve-like or cup-like thrust piece of the thrust element mounted in the housing of the brake caliper in a rotationally fixed but displaceable manner. The adjusting spindle is designed as a hollow spindle which encloses the entire adjusting device.

The rear clutch ring is mounted on the bearing seat body of a lever via a preferably low-friction bearing element so that it can rotate. Since, in addition, the adjusting spindle is in direct contact with the bearing seat body at its end facing away from the brake disc, the main force flow of the clamping force introduced by the lever runs from the bearing seat body of the lever directly via the adjusting spindle and via the threaded engagement in the thrust piece and thus via a brake lining connected to the latter onto the brake disc when braking takes place. The adjusting device is thus essentially decoupled from the clamping force.

A return spring of the return device acts on the front clutch ring, a retaining ring being provided between the return spring and the front clutch ring, and the front clutch ring being rotatably mounted on the retaining ring via a further low-friction bearing element. On the side opposite the retaining ring, the return spring is supported on the abutment shell which is rotatably mounted on the rod, the return spring extending between the abutment shell and the retaining ring over a defined axial distance. The abutment shell is axially positioned by the abutment for the spring element for pretensioning and the fastening element, which can be fastened to the end of the rod on the brake disc side, and is held there by the spring force of the return spring, the abutment shell closing off the adjusting spindle on the brake disc side towards the front and thus protectively sealing the adjusting device which is completely accommodated inside the adjusting spindle as well as the return device formed by the return spring.

The axial dimensions of the amplification mechanism, the adjusting device, the thrust element and the return device in relation to their arrangement on the rod and in relation to the installation position in the brake caliper defined by the latter can be designed in such a way that the return spring exerts a defined spring force on the second torque clutch while providing a defined torque limitation, this being done according to the invention as a whole again taking into account the pretension to be achieved.

In addition, the invention also relates to a disc brake which has a brake actuation mechanism according to at least one of the embodiments described above. In particular, the invention relates to a disc brake in which a brake actuation mechanism according to at least one of the above-mentioned configurations can be mounted by means of a rod in a housing of a brake caliper of the disc brake at least in modules or as a self-supporting unit.

Further advantages and features of the invention result from the following description of the embodiments shown on the basis of the drawings.

BRIEF DESCRIPTION OF THE DRAWINGS

FIG. 7 schematically shows a perspective view of a brake pad holder interacting with the thrust element.

DETAILED DESCRIPTION OF THE INVENTION

Figure 1:
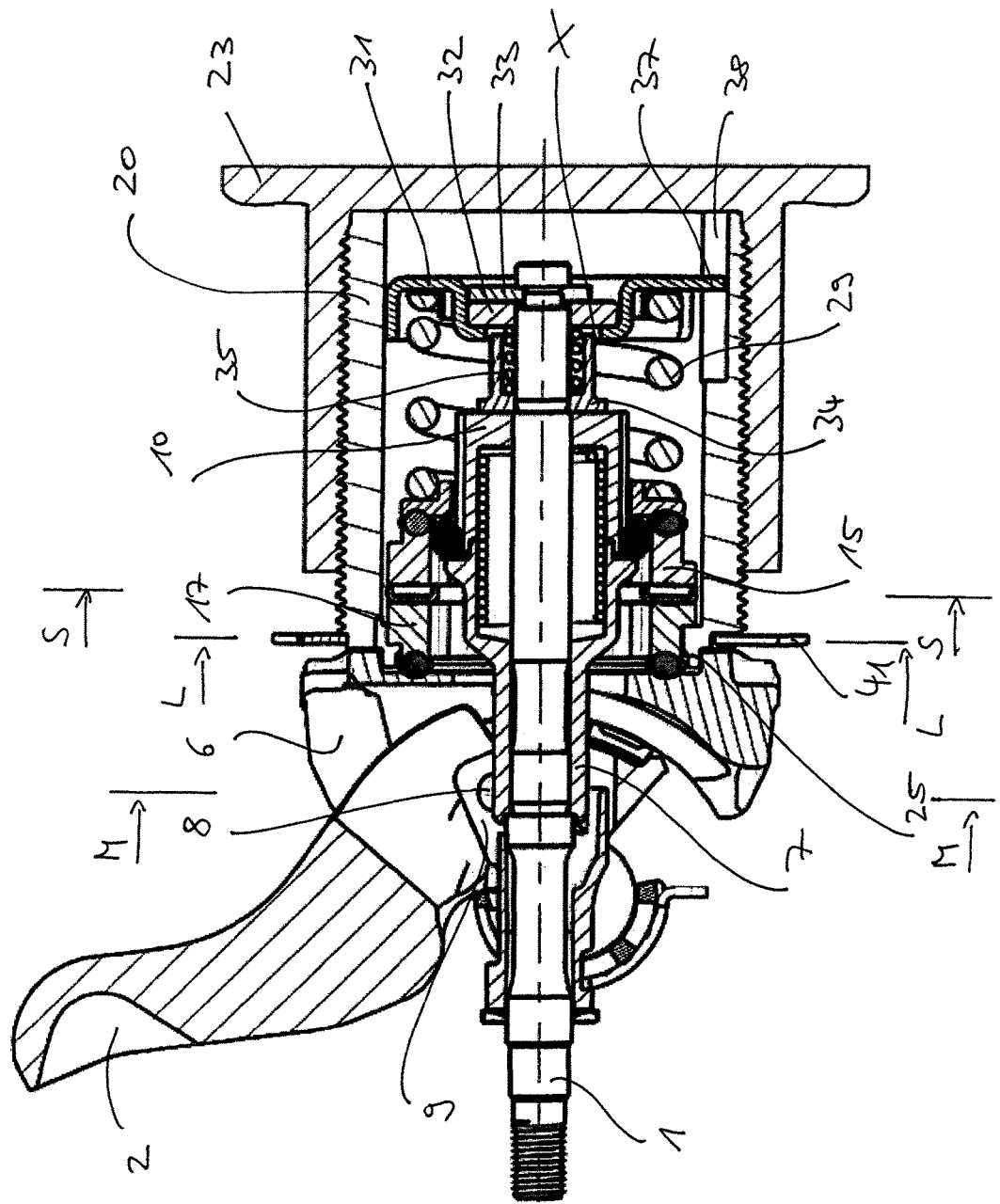
FIG. 1 is a lateral longitudinal section in the axial direction of a brake actuation mechanism according to the invention.
Figure 2A:
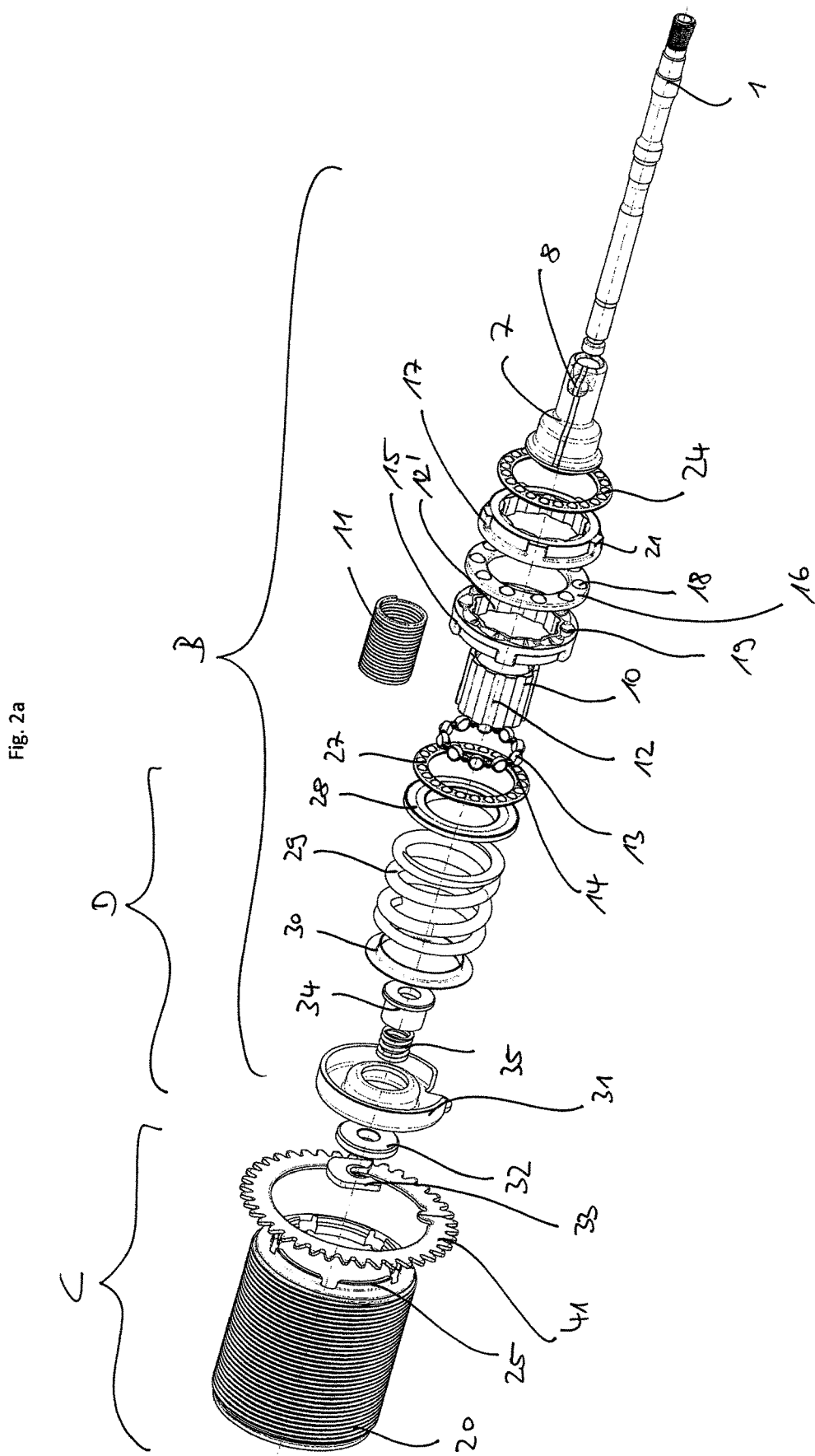
FIG. 2a is an exploded view of a part of the brake actuation mechanism.
Figure 2B:
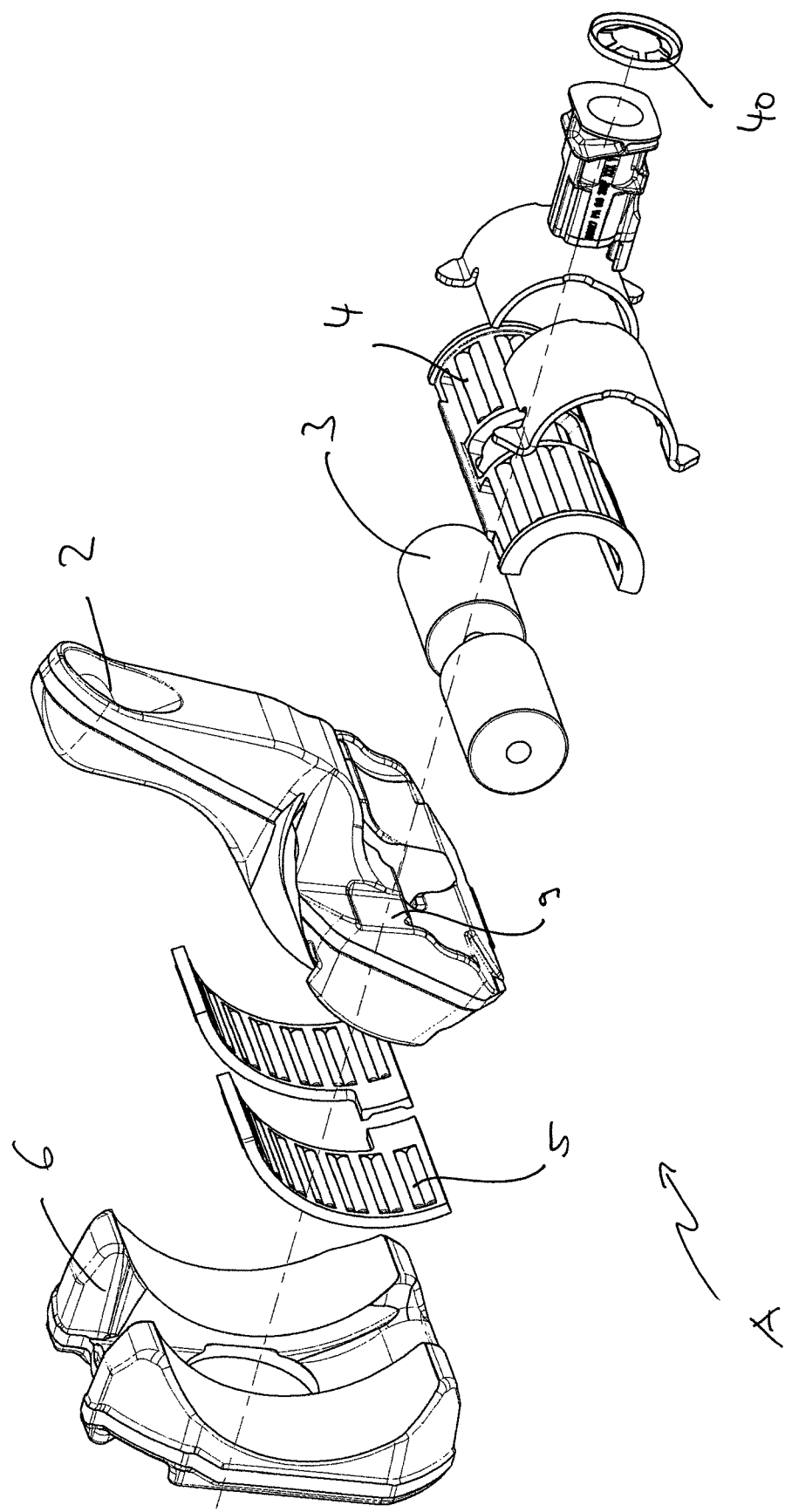
FIG. 2b is an exploded view of another part of the brake actuation mechanism.
Figure 3:
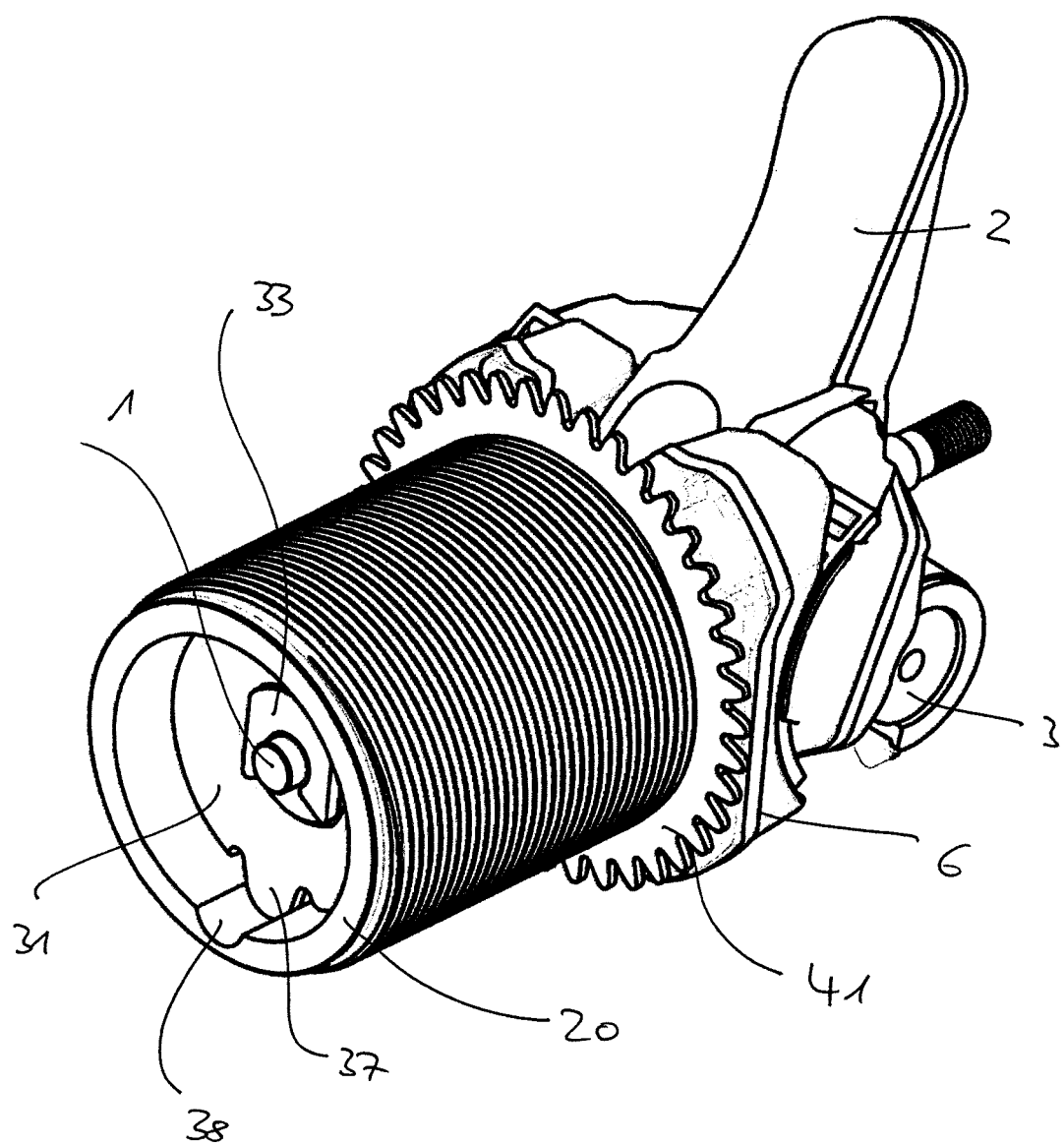
FIG. 3 is a perspective view of an assembled brake actuation operating mechanism from the front.

FIGS. 1 to 3 generally show all components of a brake actuation mechanism according to the invention. For the exact mounting position of such a brake actuation mechanism according to the invention in a housing of a brake caliper, reference is made by way of example to WO 2011/113554 A2 of the applicant, to the disclosure content of which is hereby expressly referred to.

The brake actuation mechanism according to the invention essentially consists of four modules which functionally cooperate, namely an amplification mechanism A, an adjusting device B, a thrust element C and a resetting or return device D, the brake actuation mechanism being mountable as a self-supporting unit by means of a centrally arranged rod 1 on itself and thereby in a housing of the brake caliper.

The amplification mechanism A serves to introduce an actuating force from a hydraulic, pneumatic or electromechanical actuator (not shown here) as a clamping force into the brake actuation mechanism and to amplify it according to a transmission ratio determined by its design. A lever 2 is pivotally mounted in a rear housing section of a (also not shown here) brake caliper by being rotatably arranged relative to a roller 3, the roller 3 being positioned eccentrically in relation to the axis of rotation of the lever 2. Needle bearings or needle bearing cages 4 are provided between the roller 3 and the corresponding surface of the lever 2.

On the side opposite the roller 3, the lever 2 is pivotally mounted via corresponding needle bearings or needle bearing cages 5 in corresponding bearing surfaces of a preferably one-piece bearing seat body 6.

The amplification mechanism A is designed in such a way that, as a result of a rotation around the roller 3, the lever 2 performs an eccentric displacement movement relative to the latter, which leads to a corresponding amplification of the actuating force acting on the lever 2, which is then transmitted as a clamping force to the adjusting device B and the thrust element C via a movement of the bearing seat body 6, which for this purpose may be guided directly or indirectly in a linear manner in the housing of the brake caliper, directed towards a (not shown here) brake disc.

The adjusting device B follows in the axial direction with respect to the brake disc directly after the bearing seat body 6 for lever 2.

The adjusting device B comprises several functionally interacting elements.

Figure 4A:
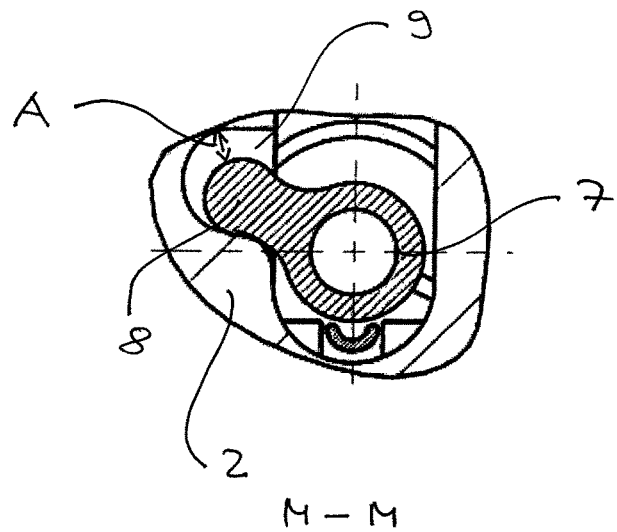
FIG. 4a is a cross-section along M-M from FIG. 1.

An input element 7, designed as a hollow shaft, for the adjusting device B is rotatably mounted on rod 1. The hollow shaft 7 has a one-piece journal or pin 8 which is accommodated in a recess 9 in the lever 2, as shown in FIG. 4a. A swivelling movement of lever 2 sets the input element 7 in rotation via the connection of pin 8 and recess 9, as will be explained in more detail below in connection with FIG. 4a.

The input element 7 is connected to an output element 10 via a freewheel spring 11, thus forming a first torque clutch. The output element 10 is also rotatably mounted on the rod 1 and is designed as a radial bearing hub with axial longitudinal grooves 12, in which balls 13 of a ball cage 14 are slidably guided.

In this way it is possible that the output element 10, which is driven in rotation by the input element 7 via the freewheel spring 11, can transmit a rotational movement to a first, front clutch ring 15 of a second torque clutch, and yet is arranged axially displaceable relative to this clutch ring 15, the clutch ring 15 also having longitudinal grooves 12' on the inside for receiving and guiding the balls 13.

The second torque clutch is formed in that the front clutch ring 15 cooperates with a second, rear clutch ring 17 via a ball bearing ring 16. The balls 18 are guided in the ball bearing ring 16 in corresponding ramps 19 arranged circumferentially in the facing end faces of both the first clutch ring 15 and the second clutch ring 17, as can be seen in FIG. 1, so that a corresponding torque-dependent roller-ramp mechanism is formed.

Figure 4B:
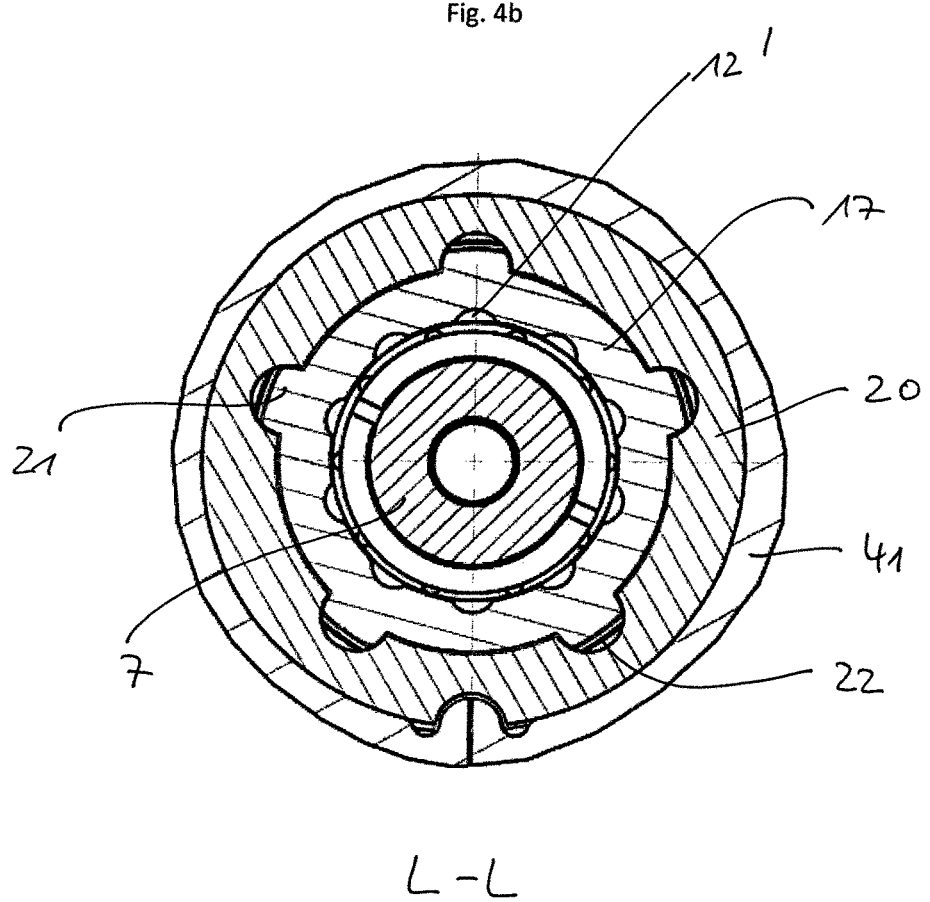
FIG. 4b is a cross-section along L-L of FIG. 1.
Figure 4C:
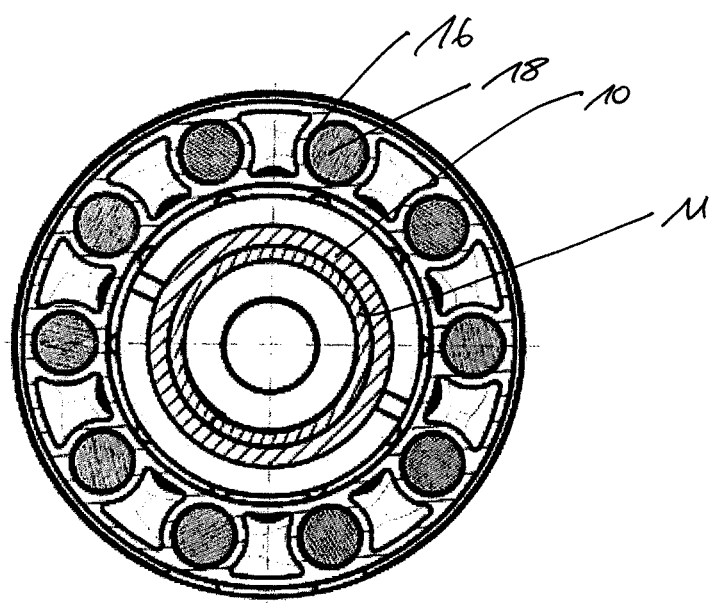
FIG. 4c is a cross-section along S-S of FIG. 1.
Figure 5:
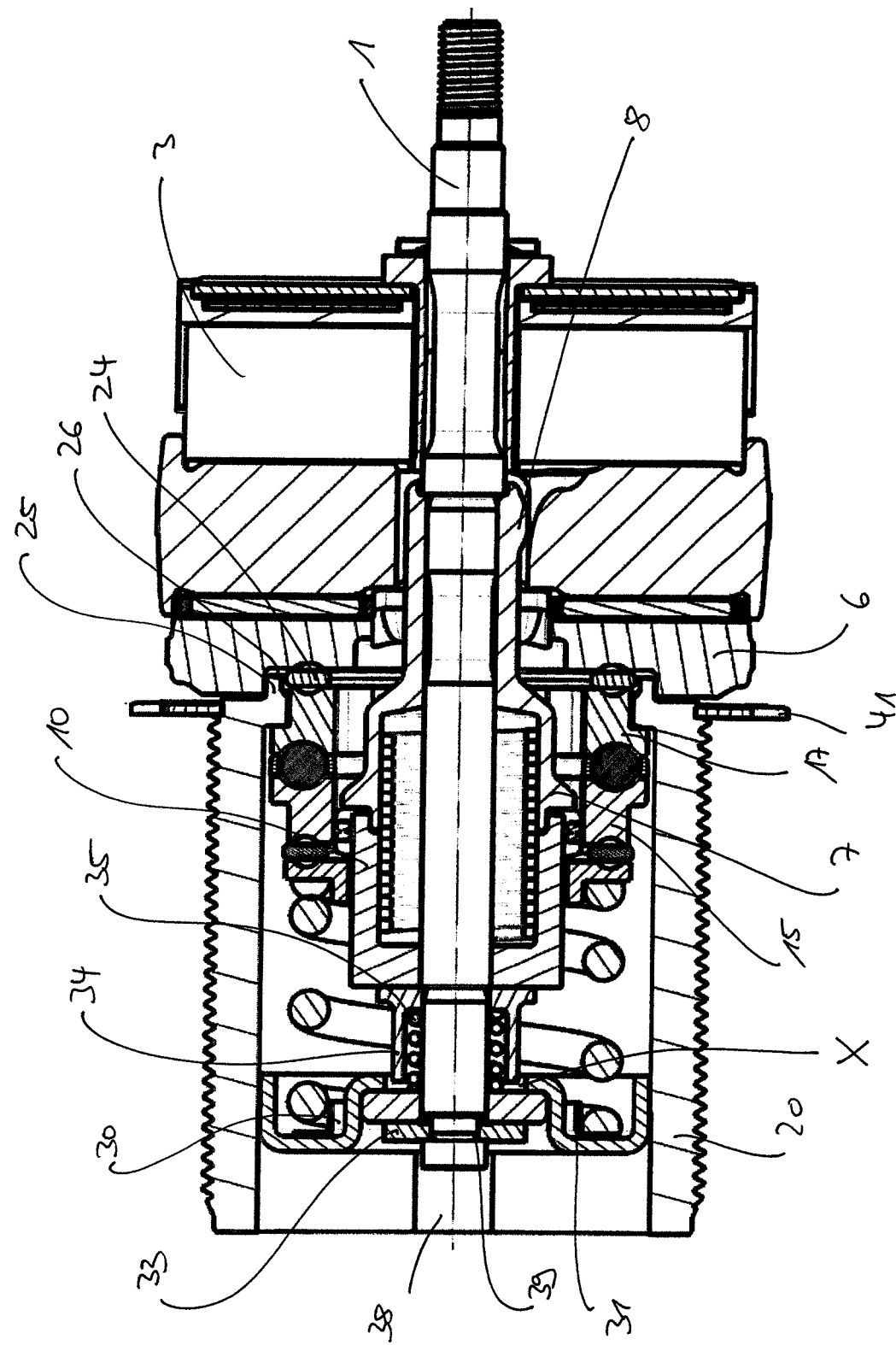
FIG. 5 is a longitudinal section in axial direction from above of the brake actuation mechanism according to the invention.
Figure 6:
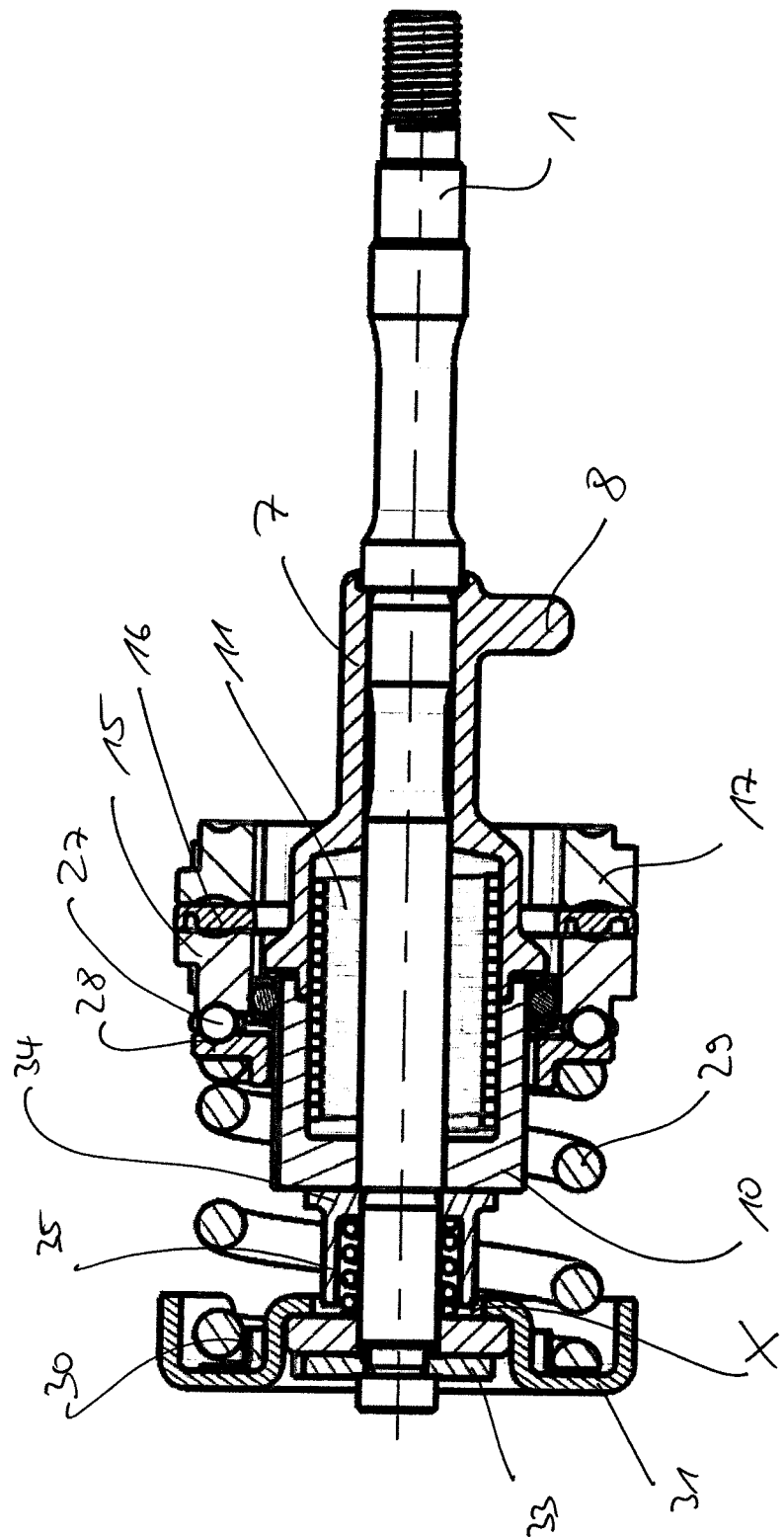
FIG. 6 is a longitudinal section in the axial direction through an adjusting and a resetting device mounted on a rod according to the invention.

The rear clutch ring 17 then transmits a rotary movement induced thereon by means of a spring-groove connection to a hollow adjusting spindle 20, for the realization of which the rear clutch ring 17 has radially protruding, circumferentially evenly distributed tongues 21, which engage in correspondingly complementarily designed grooves 22 on the radial inner side of the adjusting spindle 20, as can be seen as an example in FIGS. 4b and 5.

The adjusting spindle 20 is connected via a threaded engagement with a thrust piece 23 of thrust element C, which is guided in the housing of the brake caliper so that it can be moved linearly, but not rotated, so that a rotary movement for adjusting purposes of the adjusting spindle 20 results in a linear displacement of thrust piece 23. As can be seen, the adjusting spindle 20 completely encloses the other components of the adjusting device B. The plunger or cup-shaped thrust piece 23 of thrust element C interacts at its front side with a brake pad holder (not shown here) in order to transmit the clamping force to the brake disc.

The clamping force is introduced into thrust piece 23 by supporting the adjusting spindle 20 directly on the bearing seat body 6 of lever 2. This means that the clamping force introduced by the pivoting movement of lever 2 in the bearing seat body 6 is transmitted to the adjusting spindle 20 and via the threaded engagement to the thrust piece 23 and from there via the brake lining to the brake disc during brake engagement.

In addition, the rear clutch ring 17 is supported on the bearing seat body 6 via a low-friction thrust bearing 24. The bearing seat body 6 is in direct force-transmitting contact with the adjuster spindle 20, whereby radially circumferential axial projections 25 of the adjuster spindle 20 engage in a correspondingly designed ring recess 26 of the bearing seat body 6. This ensures that the main force flow of the clamping force from the bearing seat body 6 takes place directly into the adjusting spindle 20 and via the threaded engagement on the thrust piece 23, while the rear clutch ring 17 and thus the adjusting device B as a whole remains largely decoupled from the clamping force in the axial direction due to the low-friction axial bearing 24.

On the side opposite the axial bearing 24, the front clutch ring 15 is rotatably guided by a further low-friction axial bearing 27 on a bearing retainer ring 28.

A spring 29 of the resetting device D comes into contact with the bearing retaining ring 28. The return spring 29, which is designed as a helical spring, is in turn supported, with the interposition of a sliding ring 30, on an abutment shell 31 which is attached to the end of rod 1 facing the brake disc. The return spring 29 is designed to exert a defined pretension on the second torque clutch, which determines the limiting transmission torque between the clutch rings 15, 17.

In this case, the abutment shell 31 is held by an abutment ring 32 and a fastening element 33 on rod 1 in a rotatable arrangement, as explained below.

In the area of the front end of rod 1, a bearing sleeve 34 is provided which is supported on the side facing away from the brake disc directly on the front side of output element 10.

This bearing sleeve 34 accommodates a spring element 35, which in turn is supported on the abutment ring 32. In this way, according to the invention, a defined preload or pretension is exerted by the spring element 35 via the output element 10 on the input element 7.

At the end facing the brake disc, the bearing sleeve 34 has a distance X from the abutment ring 32, the spring element 35 passing through an opening 36 in the abutment shell 31.

It is clear that this makes it possible for the input element 7 and thus also the output element 10 with the bearing sleeve 34 to move a maximum of this distance X in the axial direction towards the brake disc, whereby the bearing sleeve 34 moves through the opening 36 in the abutment shell 31 until it comes to rest on the abutment ring 32.

When lever 2 is pivoted, recess 9 in lever 2 moves forward on a circular path towards the brake disc. Until the upper edge of the recess 9 comes into contact with the pin 8, a clearance A is first bridged, which corresponds to the wear-independent clearance of the brake, which is never readjusted, as shown in FIG. 4a.

Then the recess 9 takes the pin 8 along the circular path corresponding to the swivel movement and thus sets the input element 7 on rod 1 in rotation.

At the same time, due to the feed resulting from the circular path as a result of the swivel movement from recess 9 or lever 2, a force is exerted on pin 8 in the direction of the brake disc. Since the input element 7 and, in principle, also the entire adjusting device B is mounted on rod 1 so as to be axially displaceable, the input element 7 together with the adjusting device B performs an axial forward movement on rod 1 which is directed against the pretension of spring element 35.

This forward movement comes to an end when, after bridging the distance X, the bearing sleeve 34 comes into contact with the abutment ring 32.

Due to the fact that, in addition to the rotation, the pin 8 can also move forward by a maximum length X together with the recess 9, the forces acting in the contact point between the recess 9 and the pin 8 are reduced in the axial direction and the contact friction is thus minimized, which, while reducing wear, significantly increases the service life of this device.

According to the invention, the distance X shall be chosen in such a way that the reduction of the forces can take place to a sufficient extent and at the same time the functional reliability of the force transmission between lever 2 and pin 8 is guaranteed for each wear condition for the activation of the adjusting device B.

The abutment shell 31 is coupled to the adjusting spindle 20 in a torque-transmitting manner in that a projection 37 of the abutment shell 31 is guided in an axial longitudinal groove 38 on the inner surface of the adjusting spindle 20 in a displaceable manner, as shown in FIG. 3.

Since the abutment shell 31 rotates with the adjuster spindle 20, the end of the return spring 29 facing the brake disc is decoupled via the sliding ring 30 mounted in the abutment shell 31.

The fastening element 33, which is placed on an annular groove 39 of rod 1, and the abutment ring 32 can therefore rotate together with the abutment shell 31. According to the invention, the frictional behaviour between the fastening element 33 and the rod 1 in the annular groove 39 during such a rotation is determined by appropriate dimensioning of these elements and/or determination of the surface condition in the contact surfaces in such a way that as a reaction a defined counter-torque is exerted on the entire brake actuating mechanism, which is capable of reducing the wear between components arranged movably relative to one another, in particular of the adjusting device B.

As can be seen in FIG. 1, the entire brake actuating mechanism is held on the brake disc side by the fastening element 33 rotatably mounted on the rod 1 and on the brake disc side by a fixing or fastening ring 40 on the rod 1, by arranging the amplification mechanism A, the adjusting device B, the thrust element C and the resetting device D in a functionally co-operating manner, the hollow adjusting spindle 20 completely accommodating the remaining components of the adjusting device B and the resetting device D. The brake actuating mechanism can be mounted and secured as a unit in a housing of the brake caliper by means of rod 1.

At the beginning of a brake application, when there is no contact yet with the brake lining and the brake disc and consequently no braking force is transmitted, and when the lever 2 during a forward movement of the bearing seat body 6 causes the hollow shaft 7 to rotate via the pin 8, the freewheel spring 11 of the first torque clutch locks the input element 7 with the radial bearing hub 10, so that both rotate together. Via the radial bearings 13, 14 this rotation is then transmitted accordingly to the front clutch ring 15.

The correspondingly dimensioned return spring 29, which acts on the roller-ramp mechanism of the second torque clutch, limits the torque with respect to the rear clutch ring 17, which is coupled to the adjusting spindle 20 in a rotationally fixed manner. Due to the spring force exerted by the coil spring 29, the front clutch ring 15 also rotates the rear clutch ring 17 and thus the adjusting spindle 20 which is connected to it via the tongue-groove connection. The rolling elements 18 remain stationary in the ramp surfaces 19 formed in the front clutch ring 15 on one side and in the ramp surfaces formed in the rear clutch ring 17 (not shown). The ramp surfaces 19 are designed in a continuous circular shape as ramps that merge into each other, so that one rolling element 18 can jump over into the next ramp surface 19 if required.

As the thrust piece 23 is guided exclusively axially in the housing of the brake caliper and therefore cannot rotate, rotation of the adjusting spindle 20 causes an axial displacement of the thrust piece 23, thereby bridging the clearance which corresponds to clearance A in recess 9 in lever 2.

If the brake lining now comes into contact with the brake disc during brake actuation, a closed force flow is formed with a corresponding counterforce to the force introduced. As the force increases in the axial direction, there is a point at which the torque induced by friction in the threaded engagement between thrust piece 23 and adjusting spindle 20 will be greater than the torque induced by the coil spring 29 in the second torque clutch for torque limitation. As a result, the adjusting spindle 20 and therefore the rear clutch ring 17 will stop.

At this moment, however, the input element 7, the output element 10 and the front clutch ring 15 continue to rotate, which causes the rolling elements 18 no longer to remain stationary, but to continue moving in the ramp surfaces 19 and to run up against them.

Since the rear clutch ring 17 is supported relative to the bearing seat body 6 by a low-friction axial bearing 24, the run-up of the rolling elements 18 causes the front clutch ring 15 to move away from the rear clutch ring 17 towards the brake disc, thus compressing the coil spring 29. This compression takes place during the entire brake actuating movement and quasi forms the elastic component for the subsequent return movement.

If the actuator no longer introduces any force into the brake actuation mechanism, the return movement supported by the return device D begins.

Initially, there is still contact between the brake pad and the brake disc, where considerable forces are still acting. The individual components, rear clutch ring 17 and front clutch ring 15 with the rolling elements 18 between them and the input element 7 then rotate in the opposite direction until they resume their original angular position at the start of braking. These components therefore reverse their movements during the braking stroke according to the elastic component mentioned above.

If no abrasion has occurred on the brake lining during the brake stroke and therefore there is no wear on the brake lining, a force-conducting contact between the brake linings and the brake disc ends exactly at the time when the components, rear clutch ring 17, front clutch ring 15 and the input element 7 resume their output angular position. These components then remain in position until the pin 8, when lever 2 swivels in the opposite direction, comes into contact with the opposite stop face of recess 9 of lever 2. Then the input shaft 7, possibly supported by the pretension of the spring element 35, is actively rotated in the opposite direction by the backward swivelling movement of lever 2, while the output element 10 and the front clutch ring 15 remain stationary due to the freewheel spring 11. In this phase the freewheel spring 11 then slips through at an angle corresponding to the adjustment of the clearance during the braking stroke.

If, on the other hand, there is wear on the brake lining after the brake stroke, for example after a strong emergency braking, the force-conducting contact between the brake linings and the brake disc is cancelled out before the components, rear clutch ring 17 and front clutch ring 15 with the rolling elements 18 in between, have been able to resume their initial angular position.

At this point, the force exerted by the coil spring 29 in the axial direction on the second torque clutch causes the adjusting spindle 20 to start rotating, thus compensating for wear. The further motion sequence of the individual components is then exactly the same as for the case described above without wear.

A gear wheel 41 is arranged on the adjusting spindle 20, which is positioned at a certain axial distance from the bearing seat body 6, so that no clamping force is introduced directly into this gear wheel. The gear wheel 41 is used to reset the adjuster B if the brake linings have to be replaced. For this purpose it interacts with a separate mechanism (not shown) which can be operated from outside the brake caliper. In the embodiment shown, gear wheel 41 is also decoupled from the output element of the second torque clutch, the rear clutch ring 17. However, it is also conceivable that this clutch ring 17, instead of directly driving the adjusting spindle 20, drives the gear wheel 41 located thereon and thus indirectly the adjusting spindle 20, which for this purpose may have radially inwardly directed projections which pass through corresponding openings in the adjusting spindle 20 and enter into a corresponding torque-transmitting tongue-groove connection or the like with the clutch ring 17, although the gear wheel 41 is still located outside the force flow of the clamping force.

FIG. 7 shows an example of a brake pad retainer 42 for a brake pad 43, which interacts with the thrust piece of thrust element C.

As mentioned, the thrust piece does not have to be guided rotatably in the housing of the brake caliper, so that a rotation of the adjusting spindle 20 can lead to a linear adjusting movement of the thrust piece.

The brake pad retainer 42 has an annular groove 44 at the rear, which is formed by a radially outer annular wall 45 and a radially inner cylinder section 46. The end of a thrust piece facing the brake disc (not shown) is designed with a complementary shape so that it can form a force-transmitting connection in both axial directions with the annular groove 44, taking into account the corresponding fits.

The ring or annular wall 45 has an upwardly directed contour 47, which is linearly guided in a sliding guide 48, whereby the sliding guide 48 is preferably formed on the underside of a hold-down device 49 for lining retaining springs 50. In this way, the thrust piece and thus, if necessary, the entire brake actuation mechanism can be linearly guided via the brake pad retainer plate 42 in the housing of the brake caliper.

The invention claimed is:

1. A brake actuation mechanism for a disc brake, comprising:
an amplification mechanism configured to introduce a clamping force for a braking operation;
a thrust element configured to transmit the clamping force to a brake disc, wherein the amplification mechanism and the thrust element cooperate with each other so that the thrust element performs a movement towards the brake disc by a displacement movement of the amplification mechanism; and
an adjusting device configured to compensate for lining wear, which cooperates with the thrust element, wherein the amplification mechanism, the thrust element and the adjusting device are mounted in the brake caliper in a functionally cooperating manner via a rod mounted in a housing of a brake caliper of the disc brake so as to be immovable in an axial direction and non-rotatable; and an input element of the adjusting device mounted on the rod in a rotatable and axially displaceable manner;

a first spring element configured to exert a pretension on the input element; and a second spring element configured to exert a pretension on the adjusting device.

2. The brake actuation mechanism according to claim 1, in which the input element of the adjusting device is under pretension.

3. The brake actuation mechanism according to claim 2, in which the input element is configured to be set into an axial displacement movement on the rod against the pretension by a displacement movement of the amplification mechanism.

4. The brake actuation mechanism according to claim 2, in which the pretension is generated by the adjusting device being supported indirectly or directly at the end of the rod facing the brake disc with the first spring element against an abutment.

5. The brake actuation mechanism according to claim 4, in which the first spring element is received in a bearing sleeve which end facing the brake disc forms a distance from the abutment which determines the maximum axial displacement path of the input element on the rod.

6. A brake actuation mechanism for a disc brake, comprising:

an amplification mechanism configured to introduce a clamping force for a braking operation;

a thrust element configured to transmit the clamping force to a brake disc wherein the amplification mechanism and the thrust element cooperate with each other so that the thrust element performs a movement towards the brake disc by a displacement movement of the amplification mechanism;

an adjusting device configured to compensate for lining wear, which cooperates with the thrust element, wherein the amplification mechanism, the thrust element and the adjusting device are mounted in the brake caliper in a functionally cooperating manner via a rod mounted in a housing of a brake caliper of the disc brake so as to be immovable in an axial direction and non-rotatable; and an input element of the adjusting device mounted on the rod in a rotatable and axially displaceable manner;

wherein the input element of the adjusting device is under pretension;

wherein the pretension is generated by the adjusting device being supported indirectly or directly at the end of the rod facing the brake disc with a spring, element against an abutment;

wherein the spring element is received in a bearing sleeve which end facing the brake disc forms a distance from the abutment which determines the maximum axial displacement path of the input element on the rod; and wherein the input element is coupled to an output element and the bearing sleeve for the spring element is supported on the output element.

7. The brake actuation mechanism according to claim 6, in which the output element cooperates with a torque clutch which is in torque-transmitting connection with a hollow spindle of the thrust element.

8. The brake actuation mechanism according to claim 7, in which the amplification mechanism comprises a lever pivotally supported in a bearing seat body, and the hollow spindle of the thrust element is directly connected to the bearing seat body in a force transmitting connection.

9. The brake actuating mechanism according to claim 8, in which the input element has a pin which projects radially and is received in a recess of the lever, the pin and the recess being shaped and dimensioned such that the pin can partially execute a screw-turning movement about the rod when the lever pivots.

10. The brake actuating mechanism according to claim 4, in which the abutment is rotatably supported on the rod.

11. A brake actuation mechanism for a disc brake, comprising:

an amplification mechanism configured to introduce a clamping force for a braking operation;

a thrust element configured to transmit the clamping force to a brake disc, wherein the amplification mechanism and the thrust element cooperate with each other so that the thrust element performs a movement towards the brake disc by a displacement movement of the amplification mechanism;

an adjusting device configured to compensate for lining wear, which cooperates with the thrust element, wherein the amplification mechanism, the thrust element and the adjusting device are mounted in the brake caliper in a functionally cooperating manner via a rod mounted in a housing of a brake caliper of the disc brake so as to be immovable in an axial direction and non-rotatable; and an input element of the adjusting device mounted on the rod in a rotatable and axially displaceable manner;

wherein the input element of the adjusting device is under pretension;

wherein the pretension is generated by the adjusting device being supported indirectly or directly at the end of the rod facing the brake disc with a spring element against an abutment;

wherein the abutment is rotatably supported on the rod; and wherein the abutment cooperates with an abutment shell on which a return device is supported, the abutment shell being in a torque-transmitting and displaceable connection with the hollow spindle.

12. A disc brake comprising the brake actuation mechanism according to claim 1.

13. The disc brake according to claim 12, in which the brake actuation mechanism according to claim 1 is mountable by a rod in a housing of a caliper of the disc brake as a self-supporting unit.

* * * * *